United States Patent
Koenigs et al.

(10) Patent No.: US 12,516,138 B2
(45) Date of Patent: *Jan. 6, 2026

(54) POLYMERIZATION OF PURGE STREAM CONTAINING 1-OCTENE

(71) Applicant: Dow Global Technologies LLC, Midland, MI (US)

(72) Inventors: David Koenigs, Pearland, TX (US); Sean W. Ewart, Pearland, TX (US); Troy E. Knight, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 508 days.

This patent is subject to a terminal disclaimer.

(21) Appl. No.: 17/914,658

(22) PCT Filed: Mar. 26, 2021

(86) PCT No.: PCT/US2021/024380
§ 371 (c)(1),
(2) Date: Sep. 26, 2022

(87) PCT Pub. No.: WO2021/202283
PCT Pub. Date: Oct. 7, 2021

(65) Prior Publication Data
US 2023/0125141 A1 Apr. 27, 2023

Related U.S. Application Data

(60) Provisional application No. 63/002,503, filed on Mar. 31, 2020.

(51) Int. Cl.
*C08F 110/14* (2006.01)
*C08F 4/64* (2006.01)
*C08F 4/76* (2006.01)

(52) U.S. Cl.
CPC ........ *C08F 4/64193* (2013.01); *C08F 110/14* (2013.01); *C08F 4/76* (2013.01); *C08F 2500/01* (2013.01); *C08F 2500/03* (2013.01)

(58) Field of Classification Search
None
See application file for complete search history.

(56) References Cited

U.S. PATENT DOCUMENTS 6,160,060 A * 12/2000 Holliday .................. C08F 2/06
526/348
6,414,094 B2 7/2002 Fujita et al.
(Continued)

OTHER PUBLICATIONS

Suzuki, N. et al., "Olefin Polymerization Using Highly Congested ansa-Metallocenes under High Pressure: Formation of Superhigh Molecular Weight Polyolefins". Macromolecules 2000, 33(3), 754-759. (Year: 2000).*

(Continued)

*Primary Examiner* — Richard A. Huhn
(74) *Attorney, Agent, or Firm* — Boyle Fredrickson S.C.

(57) ABSTRACT

The present disclosure provides a process. In an embodiment, the process includes providing a purge stream containing octene monomer. The process includes contacting, under polymerization conditions, the purge stream with a bis-biphenylphenoxy catalyst, and forming an octene polymer having an absolute weight average molecular weight (Mw(Abs)) greater than 1,300,000 g/mol and a Mw(Abs)/Mn(Abs) from 1.3 to 3.0.

6 Claims, 1 Drawing Sheet

(56) References Cited

U.S. PATENT DOCUMENTS

| | | |
|---|---|---|
| 11,208,503 B2 * | 12/2021 | Do ...................... C08F 4/64193 |
| 2020/0109220 A1 | 4/2020 | Do et al. |
| 2020/0277413 A1 | 9/2020 | Al-Haj et al. |
| 2023/0127996 A1 | 4/2023 | Koenigs et al. |

OTHER PUBLICATIONS

Suzuki, N. et al., "Olefin Polymerization Using Highly Congested ansa-Metallocenes under High Pressure: Formation of Superhigh Molecular Weight Polyolefins", Macromolecules, vol. 33, No. 3, 2000, pp. 754-759.

* cited by examiner

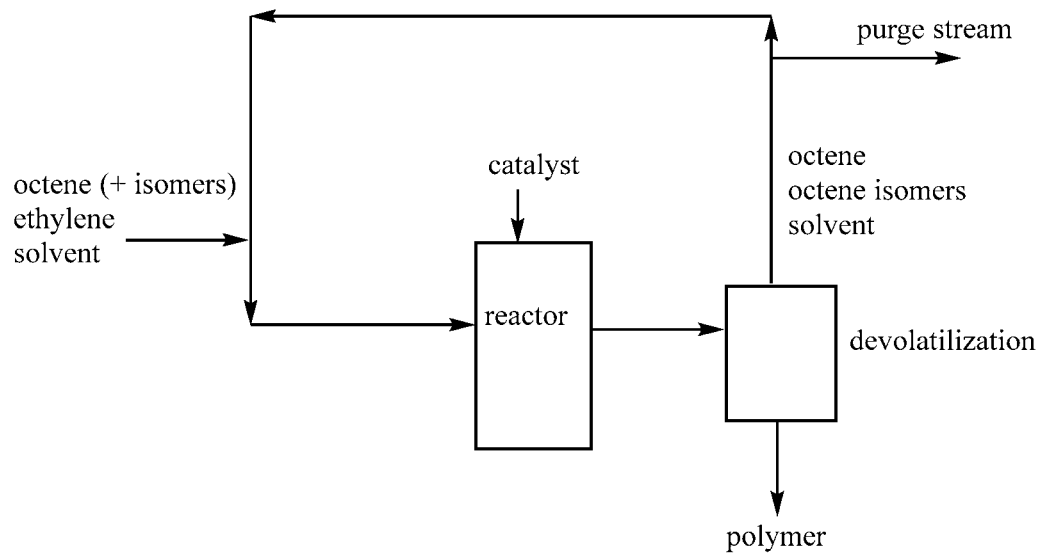

POLYMERIZATION OF PURGE STREAM CONTAINING 1-OCTENE

BACKGROUND

In the production of ethylene/octene copolymer, ethylene, octene comonomer and a polymerization catalyst are introduced into a polymerization reactor under suitable reaction conditions (in the presence of solvent and chain transfer agent) to yield an ethylene/octene copolymer polymerization product stream. The product stream is removed from the reactor and contains ethylene/octene copolymer, and hydrocarbon species of unreacted monomer (ethylene), unreacted comonomer (octene), and other associated hydrocarbons (hydrogen, ethane, methane, propane, pentane, hexane, butane). The ethylene/octene copolymer is separated from the solvent and unreacted monomer and unreacted comonomer by devolatilization. Granular ethylene/octene copolymer is subsequently collected after pelletization and cooling. After the ethylene/octene copolymer is separated from the product stream, the hydrocarbon species are either recycled back into the polymerization reactor or purged from the system.

Reclamation of the purged hydrocarbon species is one of the biggest challenges facing large scale polyolefin production. For example, conversion of the octene comonomer in ethylene/octene copolymer polymerization production is generally very low, for example between 10 and 20%. This means that 80-90% of the octene can pass through the reactor without being converted to polymer.

Ideally, the octene comonomer is recycled back to the polymerization reactor. Although the recycle of volatile monomers, like ethylene, is very efficient, the recycle of octene is difficult, especially when other saturated hydrocarbons are present in the product stream. The boiling point of octene is very close to the boiling point of other saturated and unsaturated species present in the product stream, making octene separation difficult. The fresh octene stream also includes other isomers of octene (from 1 wt % to 5 wt % octene isomers based on total weight octene). The octene isomers typically do not react with the ethylene in the polymerization process. Consequently, the octene isomers aggregate or otherwise "build up" in the continuous recirculation of the recycle stream, diminishing the efficiency of recycle as a feed stream. In this manner the octene isomers can build up to as much as 70% of the total recycle stream.

Hence, the art recognizes the on-going need for ways to utilize purge stream hydrocarbon species that avoids mere disposal of same. A need further exists for utilizing octene monomer that is present in the purge stream.

SUMMARY

The present disclosure provides a process. In an embodiment, the process includes providing a purge stream containing octene monomer. The process includes contacting, under polymerization conditions, the purge stream with a bis-biphenylphenoxy catalyst, and forming an octene polymer having an absolute weight average molecular weight ($Mw_{(Abs)}$) greater than 1,300,000 g/mol and a $Mw_{(Abs)}/Mn_{(Abs)}$ from 1.3 to 3.0.

The present disclosure provides a composition. In an embodiment, the composition includes an octene homopolymer and a solvent. The octene homopolymer has an absolute weight average molecular weight ($Mw_{(Abs)}$) greater than 1,300,000 g/mol and a $Mw_{(Abs)}/Mn_{(Abs)}$ from 1.3 to 3.0.

BRIEF DESCRIPTION OF THE DRAWING

The FIGURE is a schematic representation of a polymerization system in accordance with an embodiment of the present disclosure.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably.

The term "1-octene," as used herein, is an unsaturated hydrocarbon α-olefin having the molecular formula $C_8H_{16}$ and the unsaturation is at the alpha position. 1-octene has the molecular Structure (A) as shown below.

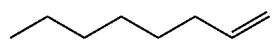

Structure (A)

The term "isomer of octene," as used herein, is an unsaturated hydrocarbon having the molecular formula $C_8H_{16}$, and the unsaturation (the double bond) is not at the alpha position. In other words, the term "isomer of octene" is any octene to the exclusion of 1-octene. Nonlimiting examples of isomers of octene include cis-2-octene, trans-2-octene, cis-3-octene, trans-3-octene, and combinations thereof as well as cis-4-octene, trans-4-octene, branched octene isomers and combinations of thereof.

An "octene-based polymer" is a polymer that contains more than 50 weight percent (wt %) polymerized octene monomer (based on the total amount of polymerizable monomers) and, optionally, may contain at least one comonomer different than octene (such as one selected from $C_{2-7}$ α-olefin and/or $C_{9-12}$ α-olefin). Octene-based polymer includes octene homopolymer, and octene copolymer (meaning units derived from octene and one or more comonomers). The terms "octene-based polymer" and "polyoctene" may be used interchangeably.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "octene/α-olefin polymer" are indicative of copolymer as described above prepared from polymerizing ethylene or octene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT).

The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. A third-order polynomial was used to fit the respective polystyrene-equivalent calibration points.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at} \frac{1}{2} \text{height}} \right)^2 \quad (EQ\ 2)$$

wherein RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

wherein RV is the retention volume in milliliters and the peak width is in milliliters, Peak max is the maximum position of the peak, one tenth height is ¹⁄₁₀ height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polystyrene equivalent molecular weight obtained from the narrow standard calibration curve for the point (i) from Equation 1.

$$Mn_{(GPC)} = \frac{\sum_i IR_i}{\sum_i (IR_i/M_{polyethylene_i})} \quad \text{(EQ 4)}$$

$$Mw_{(GPC)} = \frac{\sum_i (IR_i * M_{polyethylene_i})}{\sum_i IR_i} \quad \text{(EQ 5)}$$

$$Mz_{(GPC)} = \frac{\sum_i (IR_i * M_{polyethylene_i}^2)}{\sum_i (IR_i * M_{polyethylene_i})} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate$_{(nominal)}$) for each sample by RV alignment of the respective decane peak within the sample (RV$_{(FM\ Sample)}$) to that of the decane peak within the narrow standards calibration (RV$_{(FM\ Calibrated)}$). Any changes in the time of the decane marker peak are then assumed to be related to a linear-shift in flowrate (Flowrate$_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−1% of the nominal flowrate.

Flowrate$_{(effective)}$=Flowrate$_{(nominal)}$*(RV$_{(FM\ Calibrated)}$/RV$_{(FM\ Sample)}$) (EQ 7)

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, do/dc, of 0.104. Generally, the mass detector response (IR5) and the light scattering constant (determined using GPCOne™) should be determined from a linear polyethylene standard with a molecular weight of about 120,000 g/mole. The viscometer calibration (determined using GPCOne™) can be accomplished using the methods described by the manufacturer, or, alternatively, by using the published values of suitable linear standards. A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight (Mw$_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™) Other respective moments, Mn$_{(Abs)}$ and Mz$_{(Abs)}$ are be calculated according to equations 8-9 as follows:

$$Mn_{(Abs)} = \frac{\sum_i IR_i}{\sum_i (IR_i/M_{Absolute_i})} \quad \text{(EQ 8)}$$

$$Mz_{(Abs)} = \frac{\sum_i (IR_i * M_{Absolute_i}^2)}{\sum_i (IR_i * M_{Absolute_i})} \quad \text{(EQ 9)}$$

Residual amount of catalyst metal. A "residual amount" of catalyst metal (Ti, Hf, Zr, and Ge) is from 0 ppm, or greater than 0 ppm to less than 300 ppm, and was determined by mass balance based on added catalyst and the amount of polymer formed during reaction. Results are reported in parts per million (ppm).

Viscosity. Viscosity was measured using an Anton Paar MCR102 equipped with a CC27 cylinder measuring system and a C-ETD300 heating system using a viscosity steady state method at shear rates of 0.01-100 1/second. Approximately 20 ml of sample is added to the measuring cup and then heated to 100° C. The measuring system is then lowered into the sample until it has reached 0.0 mm. This is done over a period of time, so that the force does not reach over 15 Newtons (N). Once the measuring system has reached 0.0 mm the sample along with the measuring system is held at 100° C. for 10 minutes to allow the temperature to equilibrate. Results are reported in millipascal second (m-Pas).

DETAILED DESCRIPTION

The present disclosure provides a process. In an embodiment, the process includes providing a purge stream comprising octene monomer. The process includes contacting, under polymerization conditions, the purge stream with a bis-biphenylphenoxy catalyst. The process includes forming an octene polymer having an absolute weight average molecular weight ($Mw_{(Abs)}$) greater than 1,300,000 g/mol and a $Mw_{(Abs)}/Mn_{(Abs)}$ from 1.3 to 3.0.

The present process includes providing a purge stream. The purge stream includes octene monomer, or otherwise contains octene monomer. A "purge stream," as used herein, is one of several fractions separated, or otherwise recovered, from the effluent that exits a polymerization reactor after a polymerization reaction has occurred. The liquid effluent exiting the polymerization reactor contains solid (granular) polymer product, which is removed. A recycle stream is also removed from the effluent which is further processed and returned to the polymerization reactor. The purge stream is the stream that remains (i) after the polymer product has been recovered from the effluent and (ii) after the recycle stream has been separated from the effluent. The purge stream contains unreacted olefin monomer(s) and other hydrocarbons (hereafter referred to as "hydrocarbon species") utilized during the polymerization reaction. It is understood that the purge stream contains no, or substantially no, solid polymer product therein.

In an embodiment, the purge stream is effluent from a polymerization reactor in which ethylene is co-polymerized with octene. The purge stream includes hydrocarbon species composed of unreacted octene monomer and other hydrocarbons.

In an embodiment, the purge stream includes
(i) from 20 wt % to 50 wt %, or from 30 wt % to 40 wt % 1-octene monomer,
(ii) from 10 wt % to 50 wt %, or from 20 wt % to 40 wt % hydrocarbon solvent, and
(iii) from 10 wt % to 70 wt %, or from 20 wt % to 60 wt %, or from 30 wt % to 50 wt % octene isomers excluding 1-octene, weight percent is based on total weight of the purge stream.

In an embodiment, the process includes removing any ethylene that may be present in the purge stream. The purge stream is sparged with nitrogen gas so no ethylene is present in the purge stream. The purge stream contains no, or substantially no, ethylene monomer, i.e, from 0 wt %, or from greater than 0 wt % to less than 0.01 wt % ethylene, based on total weight of the purge stream. The purge stream includes
(i) from 20 wt % to 50 wt %, or from 30 wt % to 40 wt % 1-octene monomer,
(ii) from 10 wt % to 50 wt %, or from 20 wt % to 40 wt % hydrocarbon solvent,
(iii) from 10 wt % to 70 wt %, or from 20 wt % to 60 wt %, or from 30 wt % to 50 wt % octene isomers excluding 1-octene,
(iv) no, or substantially no ethylene monomer, and weight percent is based on total weight of the purge stream. It is understood the components (i)-(iv) amount to 100 weight percent of the purge stream.

The process includes contacting, under polymerization conditions, the purge stream with a bis-biphenylphenoxy catalyst. As used herein, "polymerization conditions," are temperature, pressure, reactant concentrations, solvent selection, chain transfer agent (CTA), reactant mixing/addition parameters, and other conditions within a polymerization reactor that promote reaction between the reagents and formation of the resultant product, namely octene polymer, or polyoctene. Polymerization may be conducted in a tubular reactor, in a stirred autoclave reactor, a continuous stirred tank reactor, a gas phase polymerization reactor, a slurry phase polymerization reactor, a loop reactor, an isothermal reactor, a fluidized bed gas phase reactor and combinations thereof in a batch process or in a continuous process.

Under polymerization conditions, the purge stream is contacted with a bis-biphenylphenoxy catalyst (or interchangeably referred to as "BBP"). The bis-biphenylphenoxy catalyst is a metal-ligand complex with a structure as shown in formula (I) below:

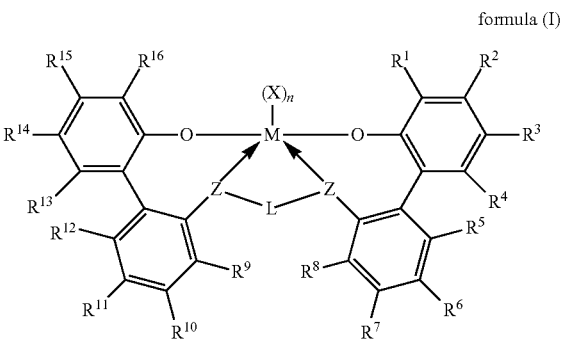

formula (I)

wherein
M is a metal selected from zirconium or hafnium, the metal being in a formal oxidation state of +2, +3, or +4;
n is an integer of from 0 to 3, and wherein when n is 0, X is absent; and
each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and
each Z independently is O, S, $N(C_1-C_{40})$hydrocarbyl, or $P(C_1-C_{40})$hydrocarbyl; and
O is O (an oxygen atom);
L is $(C_1-C_{40})$hydrocarbylene or $(C_1-C_{40})$heterohydrocarbylene, wherein the $(C_1-C_{40})$hydrocarbylene has a portion that comprises a 1-carbon atom to 10-carbon atom linker backbone linking the two Z groups in formula (I) (to which L is bonded) or the $(C_1-C_{40})$heterohydrocarbylene has a portion that comprises a 1-atom to 10-atom linker backbone linking the two Z groups in formula (I), wherein each of the 1 to 10 atoms of the 1-atom to 10-atom linker backbone of the $(C_1-C_{40})$ heterohydrocarbylene independently is a carbon atom or heteroatom, wherein each heteroatom independently is O, S, S(O), $S(O)_2$, $Si(R^C)_2$, $Ge(R^C)_2$, $P(R^C)$, or $N(R^C)$, wherein independently each $R^C$ is $(C_1-C_{30})$ hydrocarbyl or $(C_1-C_{30})$ heterohydrocarbyl; and
each $R^{1-16}$ is selected from $(C_1-C_{40})$hydrocarbyl, $(C_1-C_{40})$ heterohydrocarbyl, $Si(R^C)_3$, $Ge(R^C)_3$, $P(R_C)_2$, $N(R^C)_2$, $OR^C$, $SR^C$, $NO_2$, CN, $CF_3$, $R^CS(O)$, $R^CS(O)_2$, $(R^C)_2C=N$, $R^CC(O)O$, $R^COC(O)$, $R^CC(O)N(R)$, $(R^C)_2NC(O)$, halogen atom, hydrogen atom, and combinations thereof.

The bis-biphenylphenoxy catalyst with structure of formula (I) may be rendered catalytically active by contacting the metal-ligand complex to, or combining the metal-ligand complex with, an activating co-catalyst.

Nonlimiting examples of suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, tri-isobutylaluminum-modified methylalumoxane, and isobutylalumoxane.

Nonlimiting examples of suitable Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tetrakis(($C_1$-$C_{20}$)hydrocarbyl borate or a tri(($C_1$-$C_{20}$)hydrocarbyl)ammonium tetrakis(($C_1$-$C_{20}$)hydrocarbyl)borate (e.g. bis(octadecyl)methylammonium tetrakis(pentafluorophenyl)borate). As used herein, the term "ammonium" means a nitrogen cation that is a (($C_1$-$C_{20}$)hydrocarbylN(H)$_3^+$, or N(H)$_4^+$, wherein each ($C_1$-$C_{20}$)hydrocarbyl, when two or more are present, may be the same or different.

Nonlimiting examples of combinations of neutral Lewis acid activators (co-catalysts) include mixtures comprising a combination of a tri(($C_1$-$C_4$)alkyl)aluminum and a halogenated tri(($C_6$-$C_{18}$)aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl) borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:100, in other embodiments, from 1:1:1.5 to 1:5:30.

The bis-biphenylphenoxy catalyst with structure of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl tetrakis(pentafluorophenyl)borate(1↔) amine (i.e. [HNMe($C_{18}H_{37}$)$_2$][B($C_6F_5$)$_4$]), and combinations of both.

One or more of the foregoing activating co-catalysts are used in combination with each other. In an embodiment, the co-catalyst is a mixture of a tri(($C_1$-$C_4$)hydrocarbyl)aluminum, tri((C1-C4)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

In an embodiment, the bis-biphenylphenoxy catalyst with structure of formula (I) includes the metal M that is zirconium.

The process includes contacting the purge stream under polymerization conditions with the bis-biphenylphenoxy catalyst of formula (I), and forming an octene polymer having an absolute weight average molecular weight (Mw$_{(Abs)}$) greater than 1,300,000 g/mol and a Mw$_{(Abs)}$/Mn$_{(Abs)}$ from 1.3 to 3.0.

The process includes avoiding, or otherwise excluding, titanium-containing catalyst and/or titanium-containing co-catalyst from the contacting step.

In an embodiment, the bis-biphenylphenoxy catalyst is a metal-ligand complex having the structure formula (V) below:

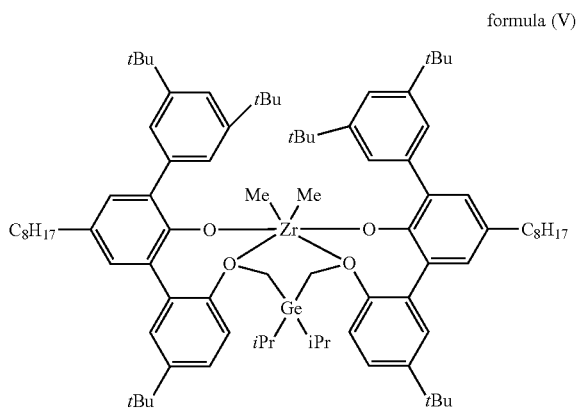

formula (V)

wherein Ge is germanium, Me is a methyl group, tBu is a t-butyl group, and iPr is an isopropyl group. The process includes contacting the purge stream under polymerization conditions with the bis-biphenylphenoxy catalyst of formula (V), and forming an octene polymer having (i) a Mw$_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol;

(ii) a Mw$_{(Abs)}$/Mn$_{(Abs)}$ from 1.3 to 3.0, or from 1.4 to 2.9, or from 1.5 to 2.8, or from 2.1 to 2.7, or from 2.2 to 2.6; and (iii) a residual amount of zirconium and a residual amount of germanium.

The process includes avoiding, or otherwise excluding, titanium-containing catalyst and/or titanium-containing co-catalyst from the contacting step.

In an embodiment, the bis-biphenylphenoxy catalyst is a metal-ligand complex having the structure formula (VI) below:

formula (VI)

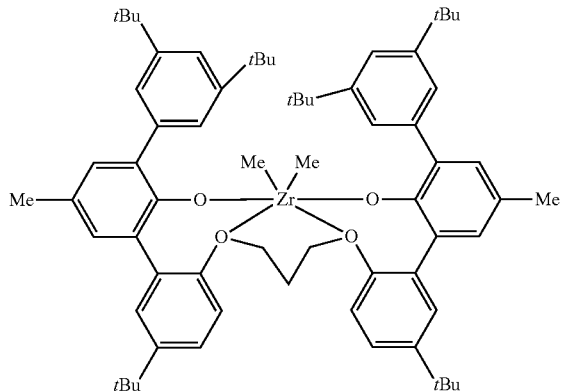

wherein Me is a methyl group, and tBu is a t-butyl group.

The process includes contacting the purge stream under polymerization conditions with the bis-biphenylphenoxy catalyst of formula (VI), and forming an octene polymer having
(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol;
(ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and
(iii) a residual amount of zirconium.

The process includes avoiding, or otherwise excluding, titanium-containing catalyst and/or titanium-containing co-catalyst from the contacting step.

The present disclosure provides a composition. In an embodiment, a composition is provided and includes (i) an octene homopolymer having an absolute weight average molecular weight ($Mw_{(Abs)}$) greater than 1,300,000 g/mol and a $Mw_{(Abs)}/Mn_{(Abs)}$ from 1.3 to 3.0. The octene homopolymer contains from 0 ppm, or greater than 0 ppm to less than 10 ppm titanium. The composition also includes (ii) a solvent.

The octene homopolymer is dissolved in the solvent. The solvent is a linear, branched, or ringed $C_4$-$C_{14}$, or $C_6$-$C_{12}$ aliphatic hydrocarbon. Nonlimiting examples of suitable aliphatic hydrocarbon solvents include butane, pentane, hexane, heptane, octane, nonane, decane, undecane, dodecane, tridecane, tetradecane, pentadecane, hexadecane, and combinations thereof.

In an embodiment, the composition includes an octene homopolymer dissolved in the solvent, the octene homopolymer is polymerized using the catalyst of formula (I), or formula (V) or formula (VI), the octene homopolymer having one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) a $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium; and/or (iv) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (v) from 0 ppm, or greater than 0 ppm to less than 10 ppm titanium.

In an embodiment, the composition includes from (i) 10 wt % to 50 wt % octene homopolymer, (ii) from 0 wt % to 70% octene isomers, and (iii) from 90 wt % to 10 wt % solvent wherein components (i), (ii), and (iii) amount to 100 wt % of the composition.

In an embodiment, the composition includes
(i) from 10 wt %, or 20 wt %, or 30 wt % to 40 wt %, or 50 wt % octene homopolymer;
(ii) from 0 wt %, or 10 wt %, or 25 wt % to 50 wt %, or 75 wt % octene isomers;
(iii) from 90 wt %, or 80 wt %, or 70 wt % to 60 wt %, or 50 wt % solvent; wherein (i), (ii), and (iii) amount to 100 wt % of the composition.

In an embodiment, the composition includes
(i) from 25 wt % or 30 wt % to 35 wt % octene homopolymer;
(ii) from 30 wt %, or 35 wt %, to 40 wt %, or 45 wt %, or 50 wt % octene isomers;
(iii) from 10 wt %, or 15 wt % to 20 wt %, or 25 wt % solvent; wherein (i), (ii), and (iii) amount to 100 wt % of the composition.

In an embodiment, the composition includes from 80 wt %, or 85 wt % to 90 wt % or 95 wt % octene homopolymer and from 20 wt %, or 15 wt % to 10 wt %, or 5 wt % solvent, the octene homopolymer and the solvent amounting to 100 wt % of the composition.

In an embodiment, the composition includes
(i) from 35 wt % to 45 wt % octene homopolymer;
(ii) from 65 wt % to 55 wt % wherein (i) and (ii) amount to 100 wt % of the composition, and
the composition has a viscosity from $2.9014*10^{+05}$ m-Pas to $3.573*10^{+07}$ m-Pas.

By way of example, and not limitation, some embodiments of the present disclosure will now be described in detail in the following Examples.

EXAMPLES

The catalysts used in the comparative samples (CS) and in the inventive examples (IE) are provided in Table 1 below.

TABLE 1

| Comparative Catalyst | Inventive Catalysts |
|---|---|
| Ziegler-Natta Catalyst (ZN) | bis-biphenylphenoxy catalyst ("BBP") formula (V) |
| BuEtMg, MgCl$_2$, Ti(OiPr)$_4$ 3 Ti: 40 Mg: 12 Al | BBP1 |

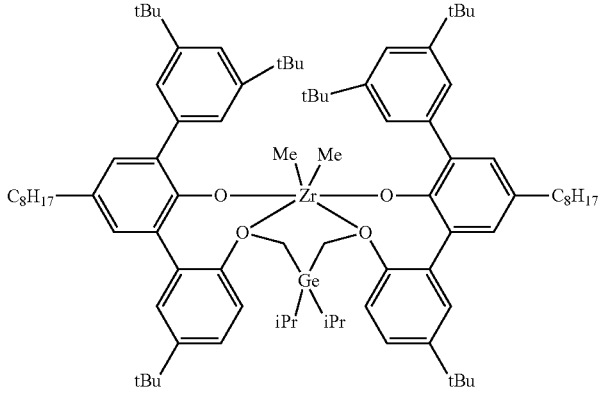

Zirconium, [[2,2'''-[[bis[1-methylethyl)germylene]bis(methyleneoxy-.kappa.O)]bis[3'',5,5''-tris(1,1-dimethylethyl)-5'-octyl[1,1':3',1''-terphenyl]-2'-olato-κO]](2-)]dimethyl-
CAS 958647-88-6

BBP 2 formula (VI)

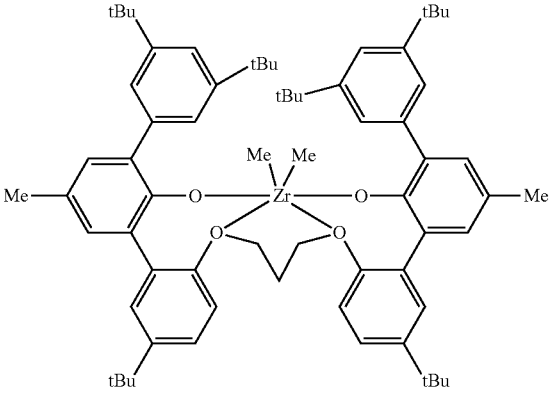

Zirconium, dimethyl[[2,2'''-[1,3-propanediylbis(oxy-κO)]bis[3'',5,5''-tris(1,1-dimethylethyl)-5'-methyl[1,1':3',1''-terphenyl]-2'-olato-κO]](2-)]-,
CAS 1001417-33-9

A. Polymerization Using Purge Stream

FIG. 1 is a schematic representation of a process for the polymerization of ethylene and octene. Ethylene monomer, Polymerization results are reported in Table 2 below.

The properties of the resulting octene homopolymers are provided in Table 2 below.

TABLE 2

| Sample | 1-Octene Source | Polymerization Catalyst | Mw (Abs) (g/mol) | Mn (Abs) (g/mol) | Mw (Abs)/Mn (Abs) | Residual Catalyst Metal[1] | Residual Germanium[1] |
|---|---|---|---|---|---|---|---|
| CS1 | Purge Stream B | ZN | 1,641,986 | 182,959 | 8.97 | 12 ppm Ti | |
| CS2 | Purge Stream B | ZN | 1,713,128 | 205,888 | 8.32 | 22 ppm Ti | |
| CS3 | Purge Stream B | ZN | 1,546,588 | 222,714 | 6.94 | 24 ppm Ti | |
| CS4 | Purge Stream B | ZN | 1,978,789 | 252,654 | 7.83 | 34 ppm Ti | |
| CS5[2] | Purge Stream A | ZN | 3,489,892 | 415,619 | 8.40 | 37 ppm Ti | |
| IE1 | Purge Stream B | BBP 1 | 1,450,248 | 1,022,374 | 1.42 | 154 ppm Zr | 123 ppm Ge |
| IE2 | Purge Stream B | BBP 1 | 2,916,512 | 1,737,924 | 1.68 | 66 ppm Zr | 52 ppm Ge |
| IE3 | Purge Stream B | BBP 1 | 3,613,644 | 2,339,626 | 1.54 | 42 ppm Zr | 34 ppm Ge |
| IE4 | Purge Stream B | BBP 1 | 3,591,749 | 2,127,218 | 1.69 | 79 ppm Zr | 63 ppm Ge |
| IE5 | Purge Stream B | BBP 1 | 4,242,200 | 2,424,465 | 1.75 | 37 ppm Zr | 29 ppm Ge |
| IE6 | Purge Stream A | BBP 1 | 4,560,503 | 2,507,790 | 1.82 | 20 ppm Zr | 16 ppm Ge |
| IE7 | Purge Stream B | BBP 1 | 4,629,554 | 2,615,446 | 1.77 | 38 ppm Zr | 30 ppm Ge |
| IE8 | Purge Stream B | BBP 1 | 5,173,683 | 2,770,996 | 1.87 | 34 ppm Zr | 27 ppm Ge |
| IE9 | Purge Stream B | BBP 1 | 5,430,769 | 2,957,812 | 1.84 | 35 ppm Zr | 28 ppm Ge |
| IE10 | Purge Stream B | BBP 1 | 5,342,830 | 2,562,221 | 2.09 | 37 ppm Zr | 29 ppm Ge |
| IE11 | Purge Stream A | BBP 1 | 8,583,521 | 5,189,585 | 1.65 | 72 ppm Zr | 58 ppm Ge |
| IE12 | Purge Stream A | BBP 1 | 6,996,782 | 3,402,438 | 2.06 | 17 ppm Zr | 14 ppm Ge |
| IE13 | Purge Stream B | BBP 2 | 1,674,376 | 944,359 | 1.77 | 40 ppm Zr | — |
| IE14 | Purge Stream B | BBP 2 | 2,243,290 | 1,070,812 | 2.09 | 44 ppm Zr | — |

[1]ppm residual catalyst metal present in octene homopolymer, based on the total weight of the octene homopolymer.
[2]Polymerization was performed at −35° C.

octene comonomer, solvent, and a catalyst, are fed into the reactor. The resulting ethylene/octene copolymer is retrieved, a recycle stream is re-introduced into the reactor, and a purge stream is isolated from the ethylene and octene polymerization process. The purge stream contains 20-50 wt % 1-octene, 10-70 wt % octene isomers, and 10-50 wt % ISOPAR-E, based on the total weight of the purge stream. ISOPAR-E is a $C_{8-12}$ aliphatic solvent, available from Exxon Chemical Co.

Purge streams used to produce either comparative samples (CS) and inventive examples (IE) are provided below:

Purge Stream A: 45% wt % 1-octene, 45 wt % octene isomers, and 10% ISOPAR-E, based on total weight of purge stream A; and Purge Stream B: 37% wt % 1-octene, 46 wt % octene isomers, and 17% ISOPAR-E, based on total weight of purge stream B.

The purge stream is collected and purged with nitrogen and stored over molecular sieves in a nitrogen-filled glovebox.

For comparative samples (CS), polymerization is conducted with a Ziegler-Natta Catalyst (ZN), in a 40 mL vial charged with 12 mL purge stream, 4 μmol catalyst (ZN), and 5 equivalents (eq.) of $Et_3Al$ (as an activator), for a period of 12 hours and at a temperature of 23-25° C. Then, solvent and unreacted octene isomers are removed under a vacuum. CS5 was polymerized in the same manner except the solution temperature was kept at −35° C. for a period of 48 hours during the polymerization.

For the inventive examples (IE1-14), polymerization is conducted with a bis-biphenylphenoxy catalyst (either BBP1 or BBP2) in a 40 mL vial charged with 12 mL purge stream, 4 μmol catalyst, and 1.2 eq. (($R_2N(H)Me\ B(C_6F_5)_4$, wherein R is hydrogenated tallowalkyl ($C_{14-18}$ alkyl)(CAS number 200644-82-2) as an activator)), for a period of twelve hours and at a temperature of 23-25° C. Then, solvent and unreacted octene isomers are removed under a vacuum.

Table 2 shows that polymerizing 1-octene from a purge stream with ZN catalysts at room temperature (CS 1-4) yielded polyoctene with molecular weights ranging from 1,500,000-1,900,000 g/mol and broad molecular weight distribution (Mw/Mn) ranging from 6.94 to 8.97. The molecular weight was significantly higher when the polymerization temperature was lowered to −35° C. (CS5).

With inventive catalysts BBP1 and BBP2 (IE 1-14), the molecular weights were significantly higher for polyoctene, the molecular weight being greater than 1,300,000 g/mol, in particular ranging from 1,400,000 g/mol to 8,600,000 g/mol, for the polymerization of 1-octene from the purge stream at room temperature. Only the inventive examples IE1-IE14 resulted in high molecular weight polyoctene (greater than 1,300,000 g/mol) with narrow molecular weight distributions (1.3-3.0 and in particular 1.42-2.09). The resulting high molecular weight polyoctene is void of titanium, or otherwise contains no titanium; the resulting high molecular weight polyoctene in inventive examples iE1-iE14 containing residual zirconium, and in inventive examples iE1-iE12 containing residual zirconium and residual germanium It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:

providing a purge stream comprising octene monomer;

contacting, under polymerization conditions, the purge stream with a bis-biphenylphenoxy catalyst having a formula (V)

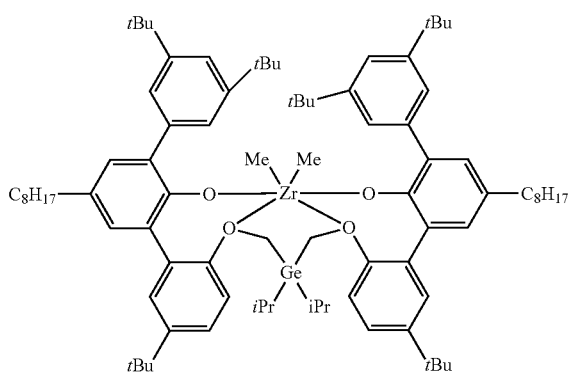

or having the formula (VI)

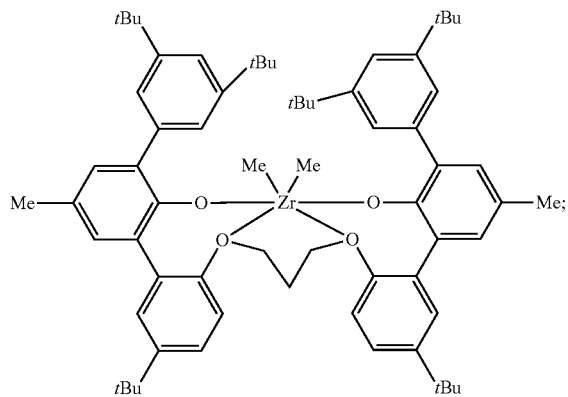

and forming an octene homopolymer having an absolute weight average molecular weight ($Mw_{(Abs)}$) greater than 1,300,000 g/mol and a $Mw_{(Abs)}/Mn_{(Abs)}$ from 1.3 to 3.0, the octene homopolymer comprising a residual amount of zirconium in an amount from greater than 0 ppm to less than 300 ppm.

2. The process of claim 1 comprising providing a purge stream composed of from 20 wt % to 50 wt % 1-octene, from 10 wt % to 50 wt % solvent, and from 10 wt % to 70 wt % octene isomers.

3. The process of claim 2 comprising removing, before the contacting, any ethylene present in the purge stream; and providing a purge stream comprising from 0 wt % to less than 0.01 wt % ethylene.

4. The process of claim 1 comprising excluding titanium-containing catalyst from the contacting step.

5. The process of claim 1 wherein the octene homopolymer comprises from 30 ppm to 160 ppm zirconium.

6. The process of claim 5 wherein the octene homopolymer comprises from 14 ppm to 125 ppm germanium.

* * * * *